(12) United States Patent
Shimamoto

(10) Patent No.: US 11,546,155 B2
(45) Date of Patent: Jan. 3, 2023

(54) DATA MANAGING APPARATUS, DATA PROCESSING APPARATUS, AND DATA MANAGING METHOD

(71) Applicant: NEC Corporation, Tokyo (JP)

(72) Inventor: Makoto Shimamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 125 days.

(21) Appl. No.: 17/030,695

(22) Filed: Sep. 24, 2020

(65) Prior Publication Data

US 2021/0111888 A1    Apr. 15, 2021

(30) Foreign Application Priority Data

Oct. 15, 2019    (JP) .............................. JP2019-188685

(51) Int. Cl.
*H04L 29/06*    (2006.01)
*H04L 9/30*    (2006.01)
*H04L 9/06*    (2006.01)

(52) U.S. Cl.
CPC .............. *H04L 9/30* (2013.01); *H04L 9/0643* (2013.01)

(58) Field of Classification Search
CPC ........ H04L 9/30; H04L 9/0643; H04L 9/3247
See application file for complete search history.

(56) References Cited

U.S. PATENT DOCUMENTS

| | | | | |
|---|---|---|---|---|
| 7,899,184 B2 * | 3/2011 | Vataja | ................... | H04L 9/3247 380/278 |
| 2016/0197934 A1 | 7/2016 | Muraoka et al. | | |
| 2017/0250979 A1 * | 8/2017 | Benson | ................. | H04L 63/102 |

FOREIGN PATENT DOCUMENTS

| | | |
|---|---|---|
| JP | 2015-201060 A | 11/2015 |
| JP | 2018-503911 A | 2/2018 |
| JP | 2018-148341 A | 9/2018 |
| JP | 2018-156633 A | 10/2018 |

OTHER PUBLICATIONS

Japanese Office action for JP Application No. 2019-188685 dated Jan. 5, 2021 with English Translation.
Hiroaki Shikano and 5 others, "Proposal and Evaluation of Efficient Sensing Information Integration Technique", IEICE Technical Report CS2009-73-CS2009-136, The Institute of Electronics, Information and Communication Engineers, Feb. 22, 2010, vol. 109, No. 436, pp. 47-52.

* cited by examiner

*Primary Examiner* — Joseph P Hirl
*Assistant Examiner* — Leynna Truvan
(74) *Attorney, Agent, or Firm* — Sughrue Mion, PLLC

(57) ABSTRACT

The present disclosure is designed to properly prevent tampering of data, which might take place in a data collection route. Data managing apparatus 100 includes a reception processing unit 131 configured to receive processing history information related to a history of processing performed on collected data and encrypted information of a first hash value generated from the processing history information using a public key associated with the processing, a generation processing unit 133 configured to generate a second hash value from the processing history information, and a maintaining unit 135 configured to maintain the processing history information when the first hash value, decrypted from the encrypted information using a private key associated with the data collection process, and the second hash value match.

8 Claims, 16 Drawing Sheets

Fig. 7

| DATA ID | DATA COLLECTION APPARATUS ID | TIME DATA IS OBTAINED | COLLECTED DATA |
|---|---|---|---|
| Data1 | Device1 | 2019/6/26 15:05:00 | {<br>timestamp:2019/6/26 15:05:00,<br>temp: 26.3<br>} |
| Data2 | Device2 | 2019/6/26 15:20:00 | {<br>timestamp:2019/6/26 15:20:00,<br>temp: 26.2,<br>humid: 40<br>} |
| ... | ... | ... | ... |

| DATA ID | PROCESSING TIME | PROCESSING PROGRAM ID | PRE-PROCESSING DATA | POST-PROCESSING DATA |
|---|---|---|---|---|
| Data1 | 2019/6/26 15:10:00 | Program1 | { <br> { timestamp:2019/6/26 15:05:00, <br> temp: 26.2, <br> humid: 40 <br> }, <br> { timestamp:2019/6/26 15:05:30, <br> temp: 26.4, <br> humid: 40 <br> } <br> } | { <br> { timestamp:2019/6/26 15:05:00, <br> temp: 26.2 <br> }, <br> { timestamp:2019/6/26 15:05:30, <br> temp: 26.4 <br> } <br> } |
| Data1 | 2019/6/26 15:10:10 | Program2 | { <br> { timestamp:2019/6/26 15:05:00, <br> temp: 26.2 <br> }, <br> { timestamp:2019/6/26 15:05:30, <br> temp: 26.4 <br> } <br> } | { <br> timestamp:2019/6/26 15:05:00, <br> temp: 26.3 <br> } |
| Data2 | 2019/6/26 15:20:30 | Program3 | { timestamp:2019/6/26 15:20:00, <br> temp: 26.2, <br> humid: 40 <br> } | { timestamp:2019/6/26 15:20:00, <br> temp: 26.2, <br> humid: 40 <br> } |
| ... | | | ... | ... |

| PROCESSING PROGRAM ID | DATE OF REGISTRATION | REGISTRANT | PRIVATE KEY | DETAILS OF PROCESSING | PROCESSING PROGRAM |
|---|---|---|---|---|---|
| Program1 | 2019/6/1 10:00:00 | XXX | AAAAAAAA··· | DELETE HUMIDITY DATA | XXXXXXXXXXXXXXXXXXX··· |
| Program2 | 2019/6/3 15:00:00 | YYY | BBBBBBBB··· | CALCULATE AVERAGE VALUE OF HUMIDITY DATA | YYYYYYYYYYYYYYYY··· |
| ··· | ··· | | ··· | ··· | ··· |

| DATA ID | PASSAGE TIME | EDGE ID |
|---|---|---|
| Data1 | 2019/6/26 15:10:00 | Edge1 |
| Data1 | 2019/6/26 15:10:10 | Edge2 |
| Data2 | 2019/6/26 15:20:30 | Edge3 |
| ... | ... | ... |

| EDGE ID | DATE OF REGISTRATION | REGISTRANT | ELECTRONIC CERTIFICATE |
|---|---|---|---|
| Edge1 | 2019/6/1 10:00:00 | XXX | AAAAAAAA··· |
| Edge2 | 2019/6/3 15:00:00 | YYY | BBBBBBBB··· |
| ··· | | | ··· |

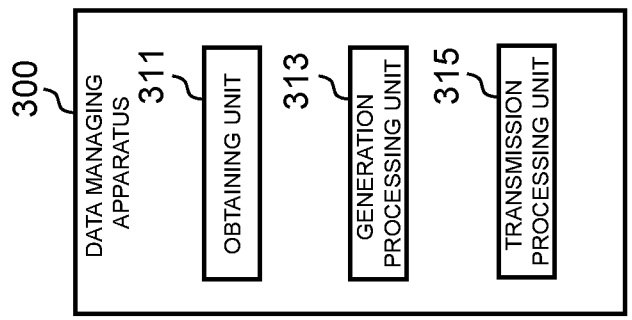

DATA MANAGING APPARATUS, DATA PROCESSING APPARATUS, AND DATA MANAGING METHOD

BACKGROUND

Technical Field

The present disclosure relates to data managing apparatus, data processing apparatus, and a data managing method for collecting data obtained by a sensor device or the like.

Background Art

Due to the spread of Internet-of-things (IoT) technologies, digitization and data collection for events that take place in the real world, and analysis of collected data using artificial intelligence (AI) technologies, are actively conducted in fields that have not been heretofore covered by information technology (IT) systems.

In such data analysis, the quality and amount of data that is collected have a significant impact. Therefore, it is important to collect more data, while ensuring the credibility of the data to make use of.

Meanwhile, regarding the method of collecting data for IoT, efficient data collection methods are spreading, in which, for example, edge devices that control an area through central apparatus perform processing such as conversion and aggregation of data collected in the area, and thereby reduce the cost of communication, and reduce the cost of processing required upon the secondary use of the data. Such a method is referred to as, for example, "edge computing", "fog computing", or the like.

For example, Patent Literature 1 describes a secure data management technology for pairing up devices and using information about this pairing to approve or reject requests (for example, data exchange requests) from these devices in a cloud environment including an Internet-of-things (IoT) cloud.

[PTL 1] JP 2018-503911 T

SUMMARY

However, the technology disclosed in Patent Literature 1 described above is silent on checking the credibility of collected data, therefore it is not possible to properly prevent tampering of data, which might take place in the data collection route.

It is therefore an example object of the present disclosure to provide data managing apparatus, data processing apparatus and a data managing method, whereby it is possible to properly prevent tampering of data, which might take place in the data collection route.

According to one example aspect of the present disclosure, a data managing apparatus includes a memory storing instructions, and one or more processors configured to execute the instructions. The one or more processors are configured to execute the instructions to receive collection history information related to a history of a data collection process and encrypted information of a first hash value generated from the collection history information using a public key associated with the data collection process, generate a second hash value from the collection history information, maintain the collection history information when the first hash value, decrypted from the encrypted information using a private key associated with the data collection process, and the second hash value match.

According to one example aspect of the present disclosure, a data processing apparatus includes a memory storing instructions, and one or more processors configured to execute the instructions. The one or more processors are configured to execute the instructions to obtain collection history information related to a history of a data collection process, generate encrypted information of a first hash value from the collection history information using a public key associated with the data collection process, and transmit the collection history information and the encrypted information of the first hash value.

According to one example aspect of the present disclosure, a data managing method includes receiving collection history information related to a history of a data collection process and encrypted information of a first hash value generated from the collection history information using a public key associated with the data collection process, generating a second hash value from the collection history information, and maintaining the collection history information when the first hash value, decrypted from the encrypted information using a private key associated with the data collection process, and the second hash value match.

According to one example aspect of the present disclosure, it is possible to properly prevent tampering of data, which might take place in the data collection route. Note that, according to the present disclosure, instead of or together with the above advantageous effects, other advantageous effects may be brought about.

BRIEF DESCRIPTION OF THE DRAWINGS

FIG. 7 is a diagram to show a specific example of a collected data table 70;

FIG. 8 is a diagram to show a specific example of a processing history data table 80;

FIG. 9 is a diagram to show a specific example of processing program information 90 that has been examined by a data distributor;

FIG. 13 is a diagram to show a specific example of a passage history data table 1300;

FIG. 14 is a diagram to show a specific example of data processing apparatus information 1400 that has been examined by a data distributor;

FIG. 16 is a block diagram to show an example of a schematic configuration of edge apparatus 200 according to the third example embodiment.

DESCRIPTION OF THE EXAMPLE EMBODIMENTS

Figure 1:
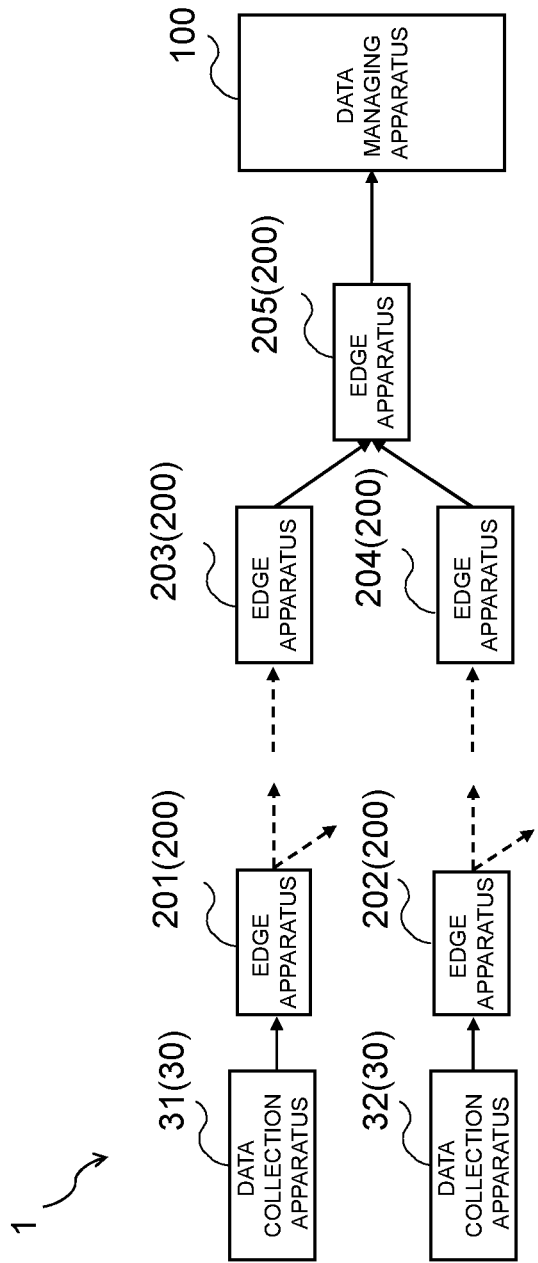
FIG. 1 is an explanatory diagram to show an example of a schematic configuration of a system 1 according to an example embodiment, to which the present disclosure is applied.

Hereinafter, example embodiments of the present disclosure will be described in detail with reference to the accompanying drawings. Note that, in the Specification and drawings, elements that can be described in the same or similar terms will be assigned the same reference signs, and overlapping description may be omitted.

The description will be given in the following order:
1. Summary of Example Embodiments of the Present Disclosure
2. Configuration of System
3. First Example Embodiment
3.1. Configuration of Data Managing Apparatus 100
3.2. Configuration of Edge Apparatus 200
3.3. Operation Example
4. Second Example Embodiment
4.1. Configuration of Data Managing Apparatus 100 and Edge Apparatus 200
4.2. Operation Example
5. Third Example Embodiment
5.1. Configuration of Data Managing Apparatus 100
5.2. Configuration of Data Processing Apparatus 300
5.3. Operation Example
6. Other Example Embodiments

1. Summary of Example Embodiments of the Present Disclosure

First, a summary of example embodiments of the present disclosure will be described.

(1) Technical Issues

Due to the spread of Internet-of-things (IoT) technologies, digitization and data collection for events that take place in the real world, and analysis of collected data using artificial intelligence (AI) technologies, are actively conducted in fields that have not been heretofore covered by information technology (IT) systems.

In such data analysis, the quality and amount of data that is collected have a significant impact. Therefore, it is important to collect more data, while ensuring the credibility of the data to use.

Meanwhile, regarding the method of collecting data for IoT, efficient data collection methods are spreading, in which, for example, edge devices that control an area through central apparatus perform processing such as conversion and aggregation of data collected in the area, and thereby reduce the cost of communication, and reduce the cost of processing required upon the secondary use of the data. Such a method is referred to as, for example, "edge computing", "fog computing", or the like.

However, for example, in the event a data collection system that is intended for edge computing is used, data users have no way of knowing what processing is applied to collected data in edge devices on the collection route. That is, businesses that make use of data have no means for checking the credibility of data provided by data distributors. To allow data users to make use of data at ease, it is necessary to properly prevent tampering of data, which might take place in the data collection route.

It is therefore an example object of example embodiments of the present disclosure to properly prevent tampering of data, which might take place in the data collection route.

(2) Technical Features

According to an example embodiment of the present disclosure, collection history information related to a history of a data collection process and encrypted information of a first hash value generated from the collection history information using a public key associated with the data collection process are received, a second hash value is generated from the collection history information, and the collection history information is maintained when the first hash value, decrypted from the encrypted information using a private key associated with the data collection process, and the second hash value match.

This, for example, makes it possible to properly prevent tampering of data, which might take place in the data collection route. Note that the above-described technical feature is a specific example of example embodiments of the present disclosure, and, obviously, example embodiments of the present disclosure are not limited to the above-described technical feature.

<<2. Configuration of System>>

Now, with reference to FIG. 1, an example of the configuration of a system 1 according to an example embodiment, to which the present disclosure is applied, will be described. FIG. 1 is an explanatory diagram to show an example of a schematic configuration of the system 1 according to an example embodiment, to which the present disclosure is applied. Referring to FIG. 1, the system 1 includes a plurality of pieces of data collection apparatus 31 and 32 (hereinafter also collectively referred to simply as "data collection apparatus 20"), a plurality of pieces of data processing apparatus 201 to 205 (hereinafter also collectively referred to simply as "edge apparatus 200"), and data managing apparatus 100.

According to the system 1 configured as above, the data collected by the data collection apparatus 30 is aggregated via a plurality of pieces of edge apparatus 200, and managed by the data managing apparatus 100. Also, referring to FIG. 1, for example, the collected data, which is collected by the data collection apparatus 31, first passes through the data processing apparatus 201, next passes through unspecified edge apparatus 200, further passes through the data processing apparatus 205, and finally reaches the data managing apparatus 100. Also, the collected data, which is collected by the data collection apparatus 32, first passes through the data processing apparatus 202, next passes through unspecified edge apparatus 200, further passes through the data processing apparatus 205, and finally reaches the data managing apparatus 100. Also, as will be described later, the data collected by the data collection apparatus 30 is subjected to the processing by unspecified edge apparatus 200, in accordance with the processing program.

3. First Example Embodiment

Next, a first example embodiment will be described with reference to FIG. 2 to FIG. 9.

<3.1. Configuration of Data Managing Apparatus 100>

Figure 2:
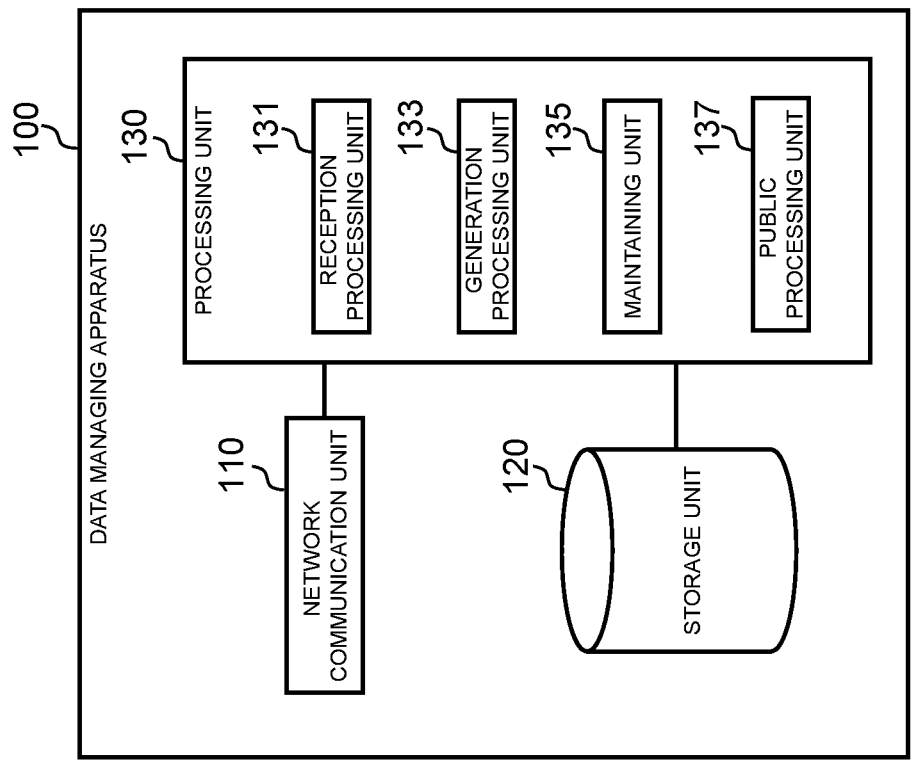
FIG. 2 is a block diagram to show an example of a schematic configuration of data managing apparatus 100 according to a first example embodiment.

Next, an example of the configuration of data managing apparatus 100 according to the first example embodiment will be described with reference to FIG. 2. FIG. 2 is a block diagram to show an example of a schematic configuration of data managing apparatus 100 according to the first example embodiment. Referring to FIG. 2, the data managing apparatus 100 includes a network communication unit 110, a storage unit 120, and a processing unit 130.

(1) Network Communication Unit 110

The network communication unit 110 receives signals from the network, and transmits signals to the network.

(2) Storage Unit 120

The storage unit 120 temporarily or permanently stores a program (commands) and parameters for the operation of the data managing apparatus 100, and a variety of types of data. The program includes one or more commands for the operation of the data managing apparatus 100.

(3) Processing Unit 130

The processing unit 130 provides various functions of the data managing apparatus 100. The processing unit 130 includes a reception processing unit 131, a generation processing unit 133, a maintaining unit 135, and a public processing unit 137. Note that the processing unit 130 may further include components besides these components. That is, the processing unit 130 can perform operations other than the operations of these components. The specific operations of the reception processing unit 131, the generation processing unit 133, the maintaining unit 135, and the public processing unit 137 will be described in detail later.

(4) Implementation Example

The network communication unit 110 may be implemented by a network adapter, a network interface card, and/or the like. The storage unit 120 may be implemented by a memory (for example, a non-volatile memory and/or a volatile memory), a hard disk, and/or the like. The processing unit 130 may be implemented by one or more processors. The reception processing unit 131, the generation processing unit 133, the maintaining unit 135, and the public processing unit 137 may be implemented by the same processor, or may be implemented separately by different processors. The memory (storage unit 120) may be included in these one or more processors, or may be provided outside these one or more processors.

The data managing apparatus 100 may include a memory that stores a program (commands) and one or more processors that can execute the program (commands). The one or more processors may execute the program and operate the processing unit 130 (operate the reception processing unit 131, the generation processing unit 133, the maintaining unit 135, and/or the public processing unit 137). The program may be a program for causing the processors to execute the operations of the processing unit 130 (operations of the reception processing unit 131, the generation processing unit 133, the maintaining unit 135, and/or the public processing unit 137).

<3.2. Configuration of Edge Apparatus 200>

Figure 3:
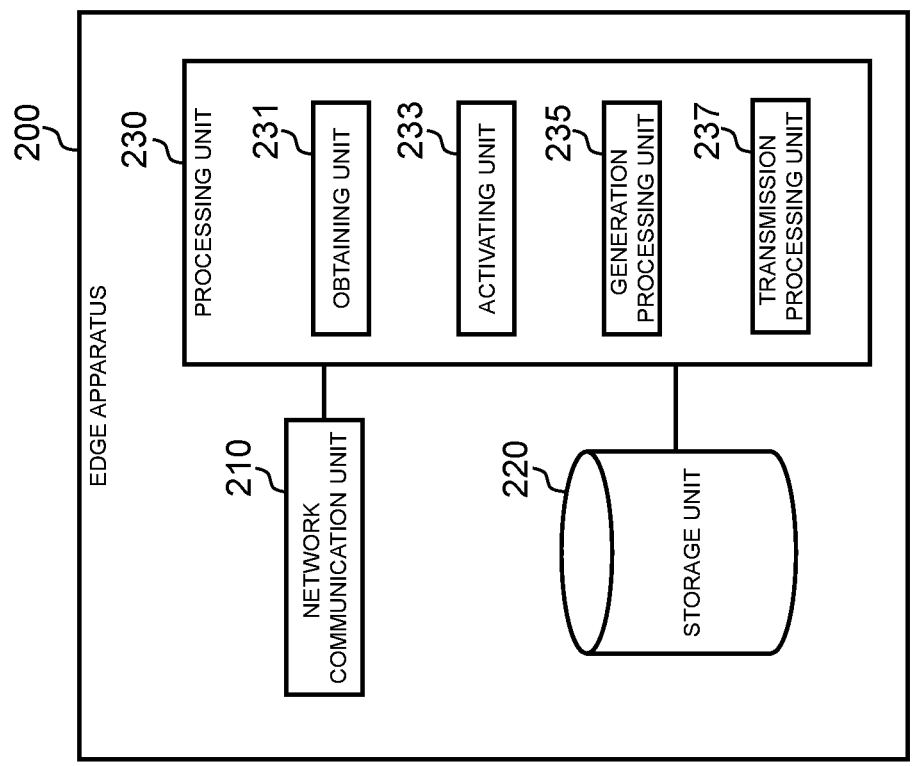
FIG. 3 is a block diagram to show an example of a schematic configuration of edge apparatus 200 according to the first example embodiment.

Next, an example of the configuration of edge apparatus 200 according to the first example embodiment will be described with reference to FIG. 3. FIG. 3 is a block diagram to show an example of a schematic configuration of edge apparatus 200 according to the first example embodiment. Referring to FIG. 3, the edge apparatus 200 includes a network communication unit 210, a storage unit 220 and a processing unit 230. The edge apparatus 200 may be referred to as, for example, an "edge device" or the like.

(1) Network Communication Unit 210

The network communication unit 210 receives signals from the network, and transmits signals to the network.

(2) Storage Unit 220

The storage unit 220 temporarily or permanently stores a program (commands) and parameters for the operation of edge apparatus 200, and a variety of types of data. The program includes one or more commands for the operation of the data managing apparatus 100.

(3) Processing Unit 230

The processing unit 230 provides various functions of the edge apparatus 200. The processing unit 230 includes an obtaining unit 213, an activating unit 233, a generation processing unit 235, and a transmission processing unit 237. Note that the processing unit 230 may further include other components besides these components. That is, the processing unit 230 can perform operations other than the operations of these components. The specific operations of the obtaining unit 213, the activating unit 233, the generation processing unit 235, and the transmission processing unit 237 will be described in detail later.

(4) Implementation Example

The network communication unit 210 may be implemented by a network adapter, a network interface card, and/or the like. The storage unit 220 may be implemented by a memory (for example, a non-volatile memory and/or a volatile memory), a hard disk, and/or the like. The processing unit 230 may be implemented by one or more processors. The obtaining unit 213, the activating unit 233, the generation processing unit 235, and the transmission processing unit 237 may be implemented by the same processor, or may be implemented separately by different processors. The memory (storage unit 220) may be included in these one or more processors, or may be provided outside these one or more processors.

The edge apparatus 200 may include a memory that stores a program (commands) and one or more processors that can execute the program (commands). These one or a plurality of processors may execute the above program and operate the processing unit 230 (operate the obtaining unit 213, the activating unit 233, the generation processing unit 235, and/or the transmission processing unit 237). The program may be a program for causing the processors to execute the operations of the processing unit 230 (operations of the obtaining unit 213, the activating unit 233, the generation processing unit 235, and/or the transmission processing unit 237).

<3.3. Operation Example>

Next, an operation example according to the first example embodiment will be described.

According to the first example embodiment, the edge apparatus 200 (obtaining unit 231) obtains processing history information related to the processing for collected data in accordance with the processing program. Furthermore, the edge apparatus 200 (generation processing unit 235) uses the public key associated with the processing and generates encrypted information of the first hash value, from the processing history information. Furthermore, the edge apparatus 200 (transmission processing unit 237) transmits the collection history information and the encrypted information of the first hash value.

Meanwhile, the data managing apparatus 100 (reception processing unit 131) receives processing history information related to the history of processing performed on the collected data, and the encrypted information of the first hash value, generated from the processing history information using the public key associated with the processing. Also, the data managing apparatus 100 (generation processing unit 133) generates a second hash value from the processing history information. Furthermore, when the first hash value decrypted from the encrypted information using a private key associated with the above processing and the second hash value match, the data managing apparatus 100 (maintaining unit 135) maintains the processing history information.

Also, as shown in FIG. 1, when a plurality of pieces of edge apparatus 200 each apply processing in accordance with the collection processing program to the collected data, the data managing apparatus 100 performs the following processing.

That is, the data managing apparatus 100 (reception processing unit 131) receives processing history information and the encrypted information of the first hash value, for the processing that is performed in each edge apparatus 200. Furthermore, the data managing apparatus 100 (generation processing unit 133) generates a second hash value from the above processing history information for the processing that is performed in each edge apparatus 200. Furthermore, for the processing that is performed in each edge apparatus 200, when the first hash value decrypted from the encrypted information using the private key associated with the above processing and the second hash value match, the data managing apparatus 100 (maintaining unit 135) maintains the processing history information.

In particular, as shown in FIG. 1, the data managing apparatus 100 receives the processing history information and the encrypted information of the first hash value related to each edge apparatus 200 from the data processing apparatus 205.

According to the first example embodiment, when the first hash value and the second hash value match, it is confirmed that the processing history information is not tampered, and the processing history information is maintained, so that it is possible to properly prevent tampering of data, which might take place in the data collection route.

(1) Specific Configuration of Edge Apparatus 200

Activating Unit 233

When an electronic signature data is affixed to the processing program, the activating unit 233 activates the processing program and starts the processing of collected data. To be more specific, the edge apparatus 200 (activating unit 233) collates a hash value that is decrypted from the electronic signature data affixed to the processing program to be activated, with a hash value that is generated from the processing program, by using, for example, an electronic certificate stored in the storage unit 120, and activates the processing program when the collation is successful.

Obtaining Unit 231

Figure 4:
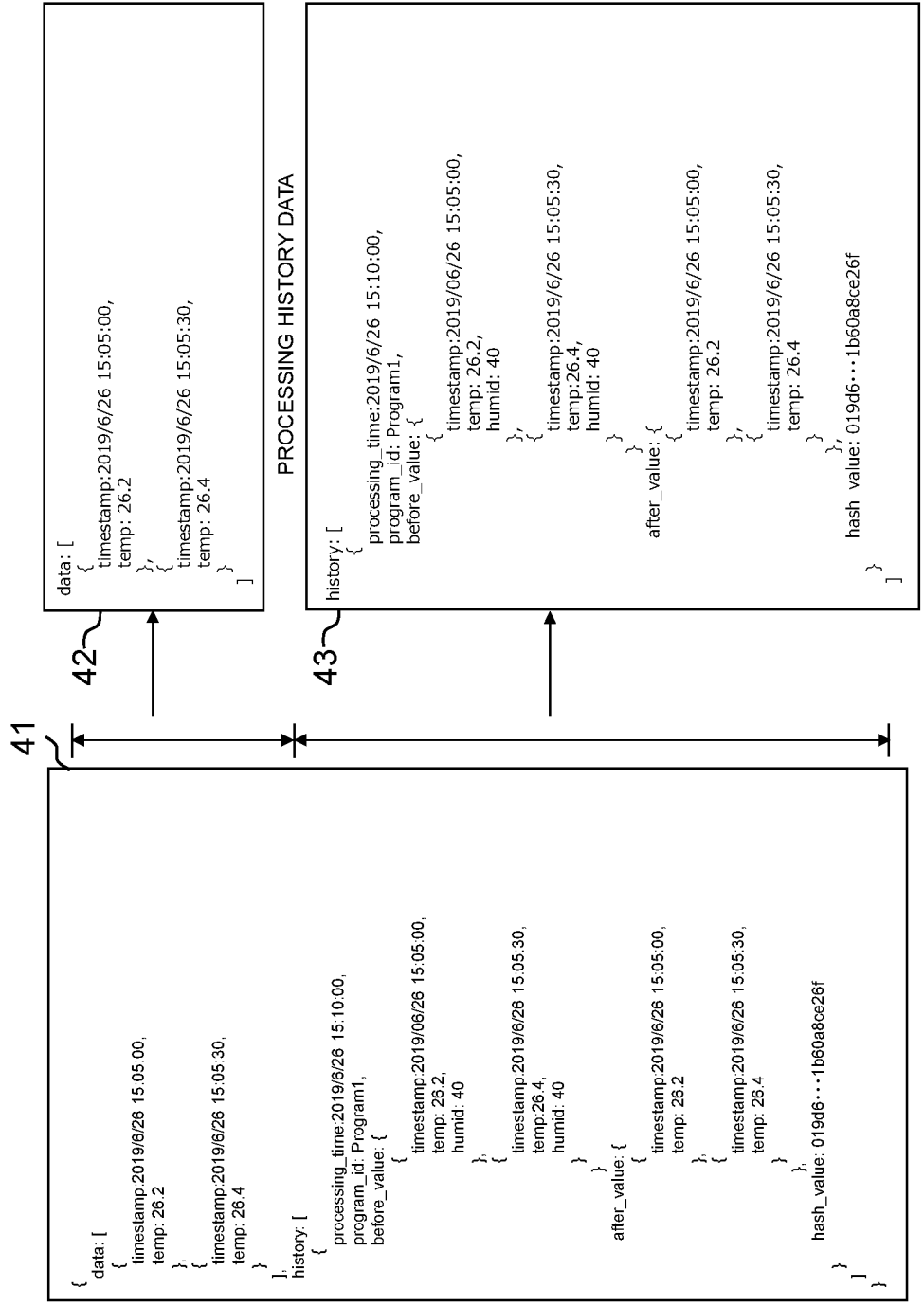
FIG. 4 is a diagram to show specific examples of data 41 received from another piece of edge apparatus 200, collected data 42, and processing history data 43 as performed by another piece of edge apparatus 200.

The obtaining unit 231 divides the data received from another piece of edge apparatus 200 located closer to the data collection apparatus 30 than the target edge apparatus 200 is, into collected data and processing history data as performed by that another piece of edge apparatus 200. FIG. 4 is a diagram to show specific examples of data 41 received from another piece of edge apparatus 200, collected data 42, and processing history data 43 as performed by another piece of edge apparatus 200.

Given the collected data 42 and the processing history data 43, the obtaining unit 231 performs processing on the collected data 42 in accordance with the processing program. Then, the obtaining unit 231 transmits the collected data 42, the processing history data 43, and the data after the processing, to the generation processing unit 133.

Generation Processing Unit 235

Referring to the collected data and the data after the processing transmitted from the obtaining unit 231, the generation processing unit 235 generates a hash value (corresponding to the above-mentioned first hash value) from the time the processing was performed, the identification information of the processing program (processing program ID), the data before the processing (collected data), and the data after the processing.

Figure 5:
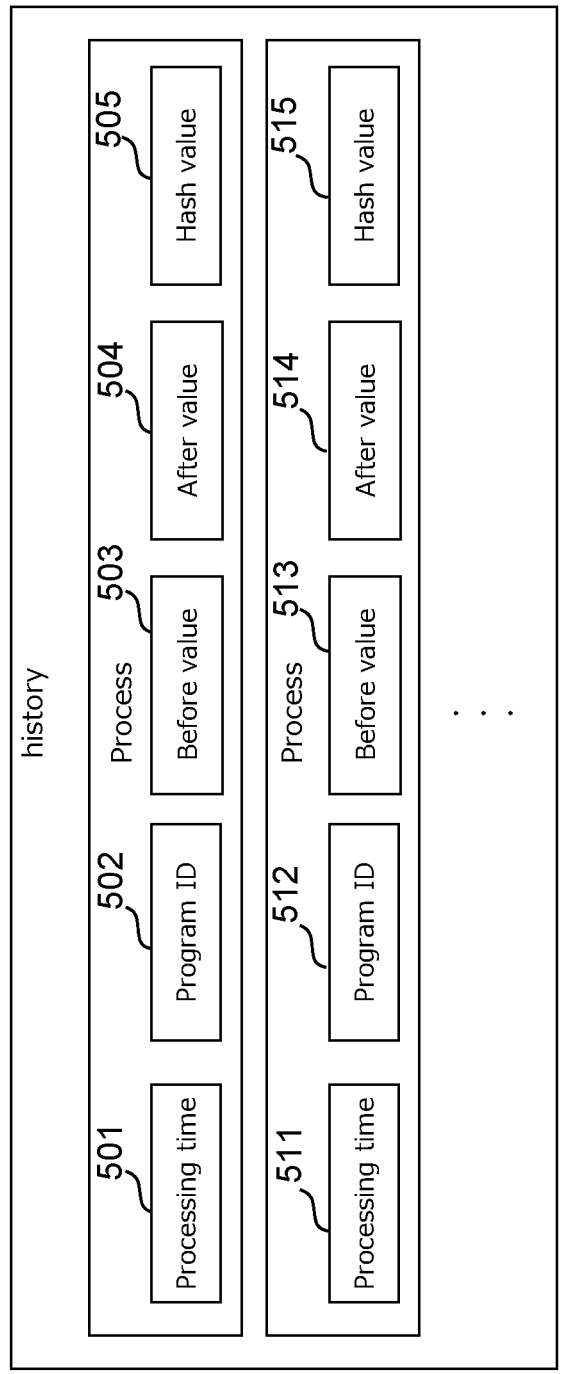
FIG. 5 is a diagram to show a data structure of processing history data arranged in chronological order.

FIG. 5 is a diagram to show a data structure of processing history data arranged in chronological order. Referring to FIG. 5, the generation processing unit 235 generates time-series data, in which, processing history data (which corresponds to the processing history data 43 shown in FIG. 4), in which a processing time 501, a processing program ID 502, pre-processing data 503, post-processing data 504, and a hash value 505, corresponding to the processing by another piece of edge apparatus 200, are associated with each other, and processing history data, in which a processing time 511, a processing program ID 512, pre-processing data 513, post-processing data 514, and a hash value 515, corresponding to the processing by the obtaining unit 231, are associated with each other, are arranged in chronological order.

To be more specific, the generation processing unit 235 generates time-series data, by attaching the processing history data, in which the processing time 511, the processing program ID 512, the pre-processing data 513, the post-processing data 514, and the hash value 515 are associated with each other, to the end of the processing history data received in another piece of edge apparatus 200. By tracing back such time-series data, the data user can backtrace the history of processing. Also, by associating processing program IDs with processing programs' names, it becomes possible to search for the processing program to be searched using the name of the processing program.

Transmission Processing Unit 237

The transmission processing unit 237 combines the collected data and the time-series data of the processing history data, and transmits this combined data to the data managing apparatus 100 or to another piece of edge apparatus 200 located near the data managing apparatus 100.

Figure 6:
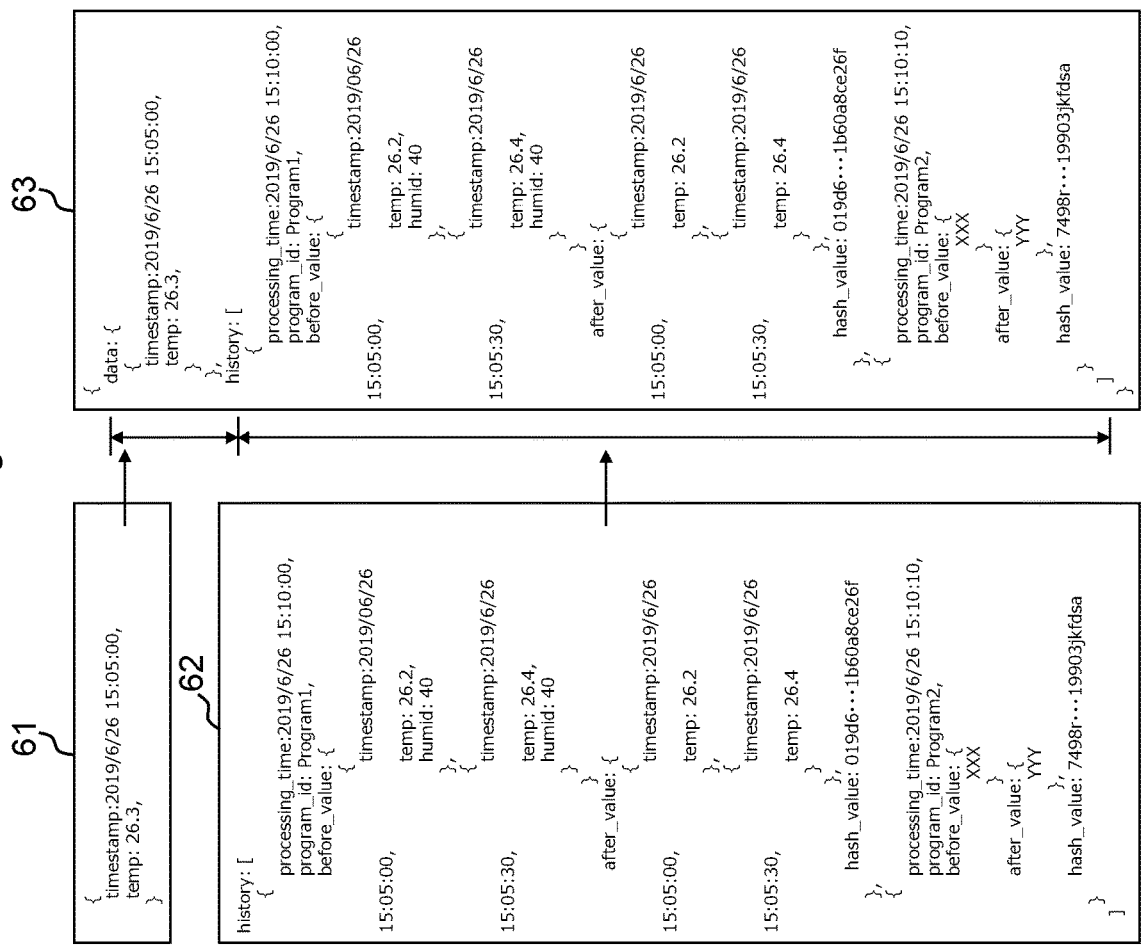
FIG. 6 is a diagram to show a specific example of transmission data 63, in which collected data 61 and time-series data 62 of processing history data are combined.

FIG. 6 is a diagram to show a specific example of transmission data 63, in which collected data 61 and time-series data 62 of processing history data are combined.

(2) Specific Configuration of Data Managing Apparatus 100

Reception Processing Unit 131

The reception processing unit 131 receives, from the edge apparatus 200, processing history information related to the history of processing performed on the collected data, and encrypted information of the first hash value, generated from the processing history information using the public key associated with the processing. Furthermore, the reception processing unit 131 decrypts the first hash value using the private key associated with the processing program ID. Then, the reception processing unit 131 transmits the received data to the generation processing unit 133.

Generation Processing Unit 133

The generation processing unit 133 generates a second hash value from the processing history information, for each processing performed in each edge apparatus 200.

Maintaining Unit 135

The maintaining unit 135 compares the second hash value generated in the generation processing unit 133 and the first hash value received in the reception processing unit 131, for each processing performed in each edge apparatus 200, and maintains the corresponding processing history information only when the first hash value and the second hash value match. To be more specific, the maintaining unit 135 stores the corresponding processing history information in the storage unit 120. On the other hand, when the first hash value and the second hash value do not match, the maintaining unit 135 determines that the corresponding processing history data has been tampered with, and, for example, discards the processing history information without storing it in the storage unit 120.

The maintaining unit 135 stores, in the storage unit 120, a collected data table, in which identification information of data (data ID), identification information of data collection apparatus 30 (data collection apparatus ID), the time data is obtained, and collected data are associated with each other. FIG. 7 is a diagram to show a specific example of a collected data table 70, in which identification information of data (data ID), identification information of data collection apparatus 30 (data collection apparatus ID), the time data is obtained, and collected data are associated with each other. As described above, at the same time data is stored, the maintaining unit 135 automatically configures the value that uniquely identifies the collected data record in the collected data table 70, and stores that configured value as the above-described data ID.

Furthermore, the maintaining unit 135 stores, in the storage unit 120, a processing history data table, in which identification information of data (data ID), the processing time of processing history information for collected data, the names of processing programs, pre-processing data, and post-processing data are associated with each other. FIG. 8 is a diagram to show a specific example of the processing history data table 80, in which identification information of data (data ID), the processing time of data processing history information for collected data, the names of processing programs, pre-processing data, and post-processing data are associated with each other. Here, in the processing history data table 80, the data ID and the value of the processing time configured in the collected data table 70 are used as a composite key that uniquely identifies the processing history record.

Furthermore, the maintaining unit 135 stores the processing program information that has been examined by the data distributor, in the storage unit 120. FIG. 9 is a diagram to show a specific example of processing program information 90 that has been examined by a data distributor. Referring to FIG. 9, the processing program information 90 includes the identification information of the processing program (processing program ID), the date of registration, the registrant, the private key, the details of processing, and the processing program's code information.

Public Processing Unit 137

For the data user, the public processing unit 137 obtains a variety of types of data included in the collected data table 70 and the processing history data table 80 stored in the storage unit 120, and displays the obtained collected data and processing history information per data ID. Furthermore, the public processing unit 137 displays the processing program information 90 obtained by using the processing program ID as a key.

(3) Process Flow

Next, the flow of processing according to the first example embodiment will be described.

First, the data distributor confirms in advance that the details of processing executed by each edge apparatus 200 (edge device) show no arbitrariness, for the processing program executed in each edge apparatus 200, and then generates a hash value from the processing program.

Next, where a private key and a public key are produced in advance, the data distributor produces a hash value, which is encrypted as an electronic signature by using the private key, an electronic certificate, which is issued by an electronic certificate authority based on the public key, and a processing program. Information about the processing program, on which an electronic signature is affixed, and which is authorized, is stored in advance in the storage unit 220 of each edge apparatus 200, by the data distributor.

Meanwhile, upon activation of the edge apparatus 200, the edge apparatus 200 (activating unit 233) collates the hash value decrypted from the electronic signature data of the target processing program, with a hash value generated from the processing program. Here, when the two hash values match, the edge apparatus 200 (activating unit 233) determines that the processing program is an authorized program, and activates the processing program. As a result of this, the processing program to subject to processing in the edge apparatus 200 can be limited to only those authorized by the distributor, so that it is possible to prevent programs, in which no electronic signature is affixed by the distributor, from causing tampering.

Next, the edge apparatus 200 (obtaining unit 231) divides the data received in the network communication unit 210 from another piece of edge apparatus 200, into collected data and processing history data. The edge apparatus 200 (obtaining unit 231) receives the collected data as input, performs processing in accordance with the processing program, and obtains the post-processing data. Following this, the edge apparatus 200 (obtaining unit 231) transmits the collected data, the post-processing data and the processing history data to the generation processing unit 235.

The generation processing unit 235 uses the time the data was received as "Processing time", the name of the processing program as "Program ID", the collected data as "Before value", and the post-processing data as "After value", and generates a first hash value by using these processing time, processing program ID, pre-processing data and post-processing data. Then, the generation processing unit 235 uses a value, in which the first hash value is encrypted with the public key associated with the electronic certificate affixed with an electronic signature in the processing program, as a hash value, and generates one record of processing history data.

The one record of processing history data generated is attached to the end of the processing history data received in the generation processing unit 235. Afterwards, the processing history data is combined with the collected data in the transmission processing unit 237, and transmitted to another piece of data processing apparatus (edge device) located on the collection route near the edge apparatus 200.

Next, the data managing apparatus 100 (reception processing unit 131) divides the collected data received from the edge apparatus 200 and a series of processing history data. Then, if the first hash value included in the processing history data and the second hash value, generated from the processing history information included in the processing history data match, the data managing apparatus 100 maintains (stores) the corresponding collected data and processing history information in the storage unit 120.

The public processing unit 137 displays the collected data stored in the storage unit 120, in response to an access request from the data user, where the data ID is the key. Furthermore, the public processing unit 137 displays the processing history information in response to an access request from the data user, where the data ID is the key. Furthermore, the public processing unit 137 displays the processing program information in response to an access request from the data user, where the processing program ID is the key.

As described above, according to the first example embodiment, the data user is able to verify whether or not there is arbitrary data modification, with respect to the processing performed on each edge apparatus 200 (edge device) in the data collection stage.

4. Second Example Embodiment

Next, a second example embodiment will be described with reference to FIGS. 10 to 14.

<4.1. Configurations of Data Managing Apparatus 100 and Edge Apparatus 200>

First, the data managing apparatus 100 according to a second example embodiment is the same as the configuration shown in FIG. 2, which has been referred to in the first example embodiment, and thus the description thereof will be omitted. Furthermore, the edge apparatus 200 according to the second example embodiment has the same configuration as that shown in FIG. 3, which has been referred to in the first example embodiment, and thus the description thereof will be omitted.

<4.2. Operation Example>

Next, an operation example according to the second example embodiment will be described.

According to the second example embodiment, the edge apparatus 200 (obtaining unit 231) obtains passage history information, which relates to the history of passage of collected data through the data processing apparatus. Furthermore, the edge apparatus 200 (generation processing unit 235) uses the public key associated with the edge apparatus 200 and generates encrypted information of the first hash value, from the passage history information. Furthermore, the edge apparatus 200 (transmission processing unit 237) transmits the passage history information and the encrypted information of the first hash value.

Meanwhile, the data managing apparatus 100 (reception processing unit 131) receives passage history information, which relates to the history of passage of collected data through the edge apparatus 200, and encrypted information of the first hash value, generated from the passage history information using the public key associated with the edge apparatus 200. Also, the data managing apparatus 100 (generation processing unit 133) also generates a second hash value from the passage history information. Furthermore, when the first hash value decrypted from the encrypted information using the private key associated with the edge apparatus 200 and the second hash value match, the data managing apparatus 100 (maintaining unit 135) maintains the passage history information.

Also, as shown in FIG. 1, when the collected data passes through a plurality of pieces of edge apparatus 200 and is transmitted to the data managing apparatus 100, the data managing apparatus 100 performs the following processing.

That is, the data managing apparatus 100 (reception processing unit 131) receives passage history information and encrypted information of the first hash value, for each edge apparatus 200. Furthermore, the data managing apparatus 100 (generation processing unit 133) generates a second hash value from the above passage history information, for each edge apparatus 200. Furthermore, when the first hash value decrypted from the encrypted information using the private key associated with the edge apparatus 200 and the second hash value match, the data managing apparatus 100 (maintaining unit 135) maintains the passage history information, for each edge apparatus 200.

In particular, as shown in FIG. 1, the data managing apparatus 100 receives the passage history information and the encrypted information of the first hash value related to each edge apparatus 200 from the data processing apparatus 205.

According to the second example embodiment, when the first hash value and the second hash value match, it is confirmed that the passage history information is not tampered, and the passage history information is maintained, so that it is possible to properly prevent tampering of data, which might take place in the data collection route.

(1) Specific Configuration of Edge Apparatus 200

Obtaining Unit 231

Figure 10:
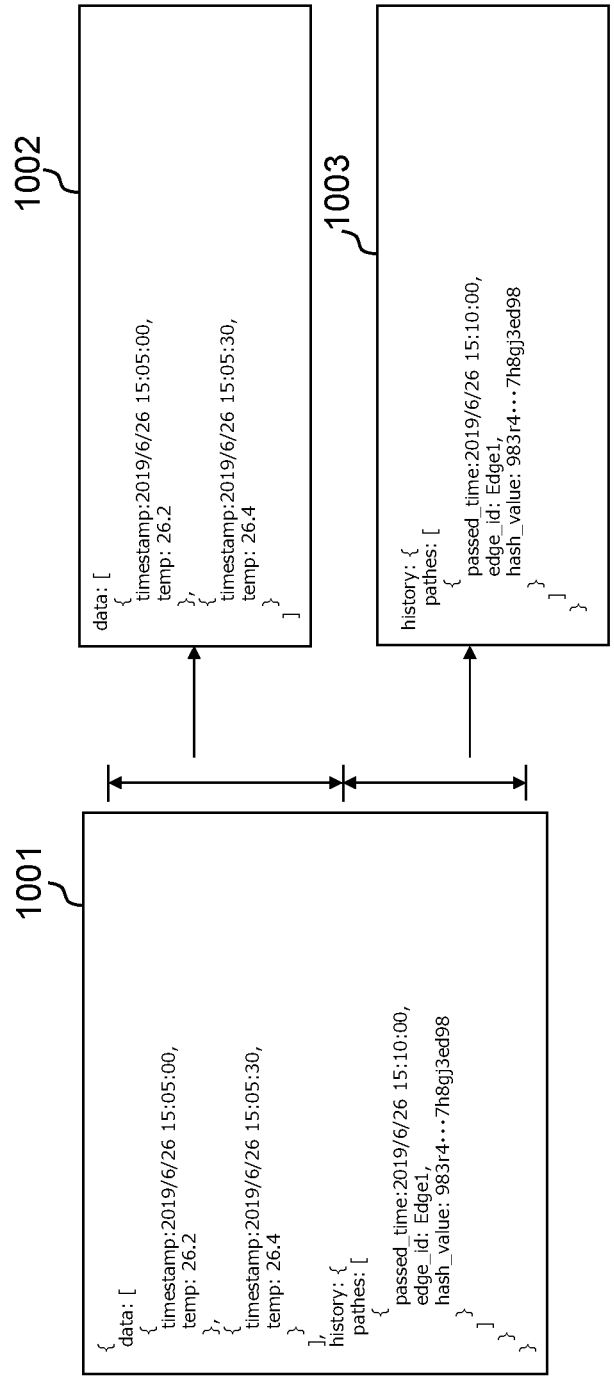
FIG. 10 is a diagram to show specific examples of data 1001 received from another piece of edge apparatus 200, collected data 1002, and passage history data 1003 of passage through another piece of edge apparatus 200.

The obtaining unit 231 divides the data received from another piece of edge apparatus 200, located closer to the data collection apparatus 30 than the target edge apparatus 200 is, into collected data and passage history data of passage through another piece of edge apparatus 200. FIG. 10 is a diagram to show specific examples of data 1001 received from another piece of edge apparatus 200, collected data 1002, and passage history data 1003 of passage through another piece of edge apparatus 200. Then, the obtaining unit 231 transmits the collected data 1002 and the passage history data 1003 to the generation processing unit 133.

Generation Processing Unit 235

The generation processing unit 235 refers to the collected data and the passage history data transmitted from the obtaining unit 231 to generate a hash value (corresponding to the first hash value) from the passage time, at which the collected data passes through the target data managing apparatus 100, and identification information of the target edge apparatus 200 (apparatus ID), through which the collected data passes.

Figure 11:
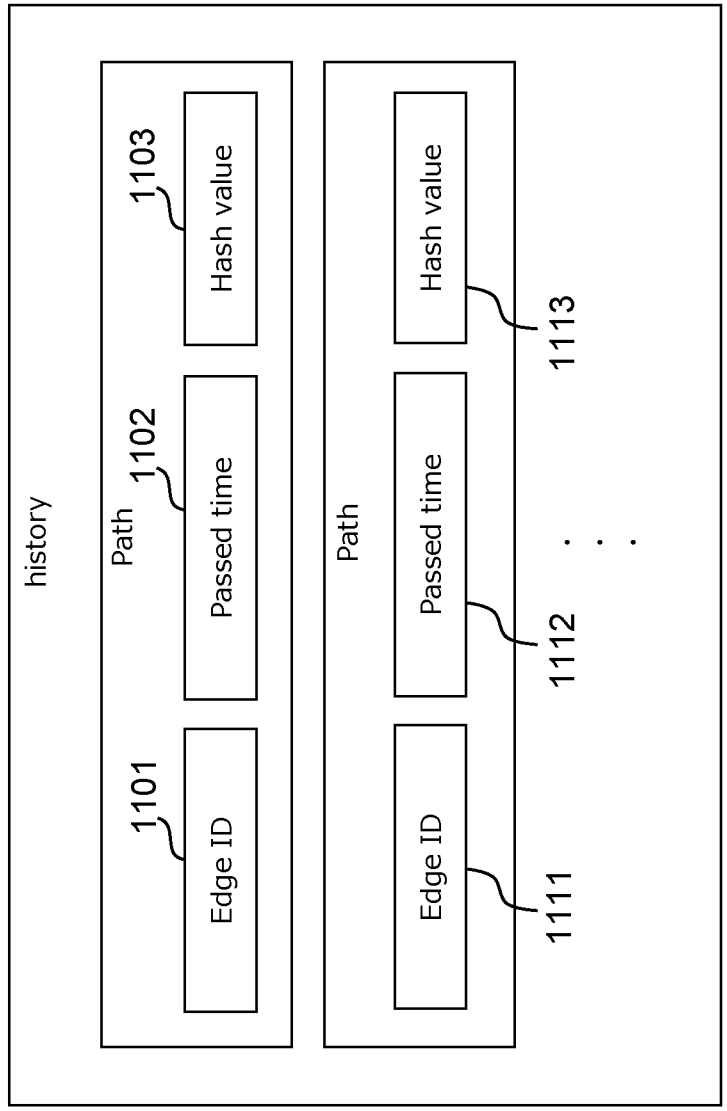
FIG. 11 is a diagram to show a data structure of passage history data arranged in chronological order.

FIG. 11 is a diagram to show a data structure of passage history data arranged in chronological order. Referring to FIG. 11, the generation processing unit 235 generates time-series data, in which passage history data, which associates the identification information of another edge apparatus 200 through which the collected data has passed (edge ID 1101), the passage time 1102 related to the passage time at which the collected data through another edge apparatus 200, and the hash value 1103 with each other (and which corresponds to the passage history data 1003 shown in FIG. 10) and passage history data, which associates the identification information of the target edge apparatus 200 (edge ID 1111), the passage time 1112 of the collected data in the target edge apparatus 200, and the hash value 1113 with each other, are arranged in chronological order.

To be more specific, the generation processing unit 235 generates the time-series data by attaching the passage history data, in which the edge ID 1111, the passage time 1112, and the hash value 1113 are associated with each other, to the end of the passage history data received in another edge apparatus 200. By tracing back such time-series data, the data user can backtrace the history of passage. Furthermore, by associating edge IDs with passage times, it becomes possible to search for the edge apparatus 200 that relayed the collected data.

Transmission Processing Unit 237

The transmission processing unit 237 combines the collected data and the time-series data of the passage history data, and transmits this combined data to the data managing apparatus 100 or to another piece of edge apparatus 200 located near the data managing apparatus 100.

Figure 12:
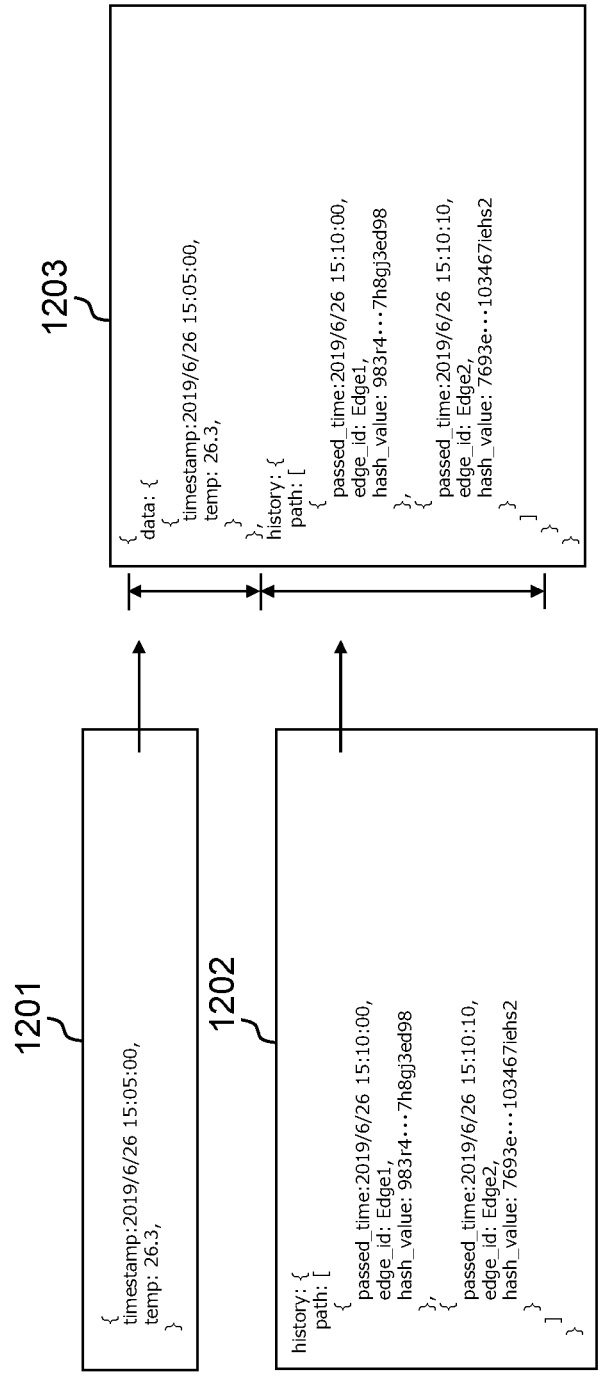
FIG. 12 is a diagram to show a specific example of transmission data 1203, in which collected data 1201 and time-series data 1202 of passage history data are combined.

FIG. 12 is a diagram to show a specific example of transmission data 1203, in which collected data 1201 and time-series data 1202 of passage history data are combined.

(2) Specific Configuration of Data Managing Apparatus 100

Reception Processing Unit 131

The reception processing unit 131 receives, from the edge apparatus 200, passage history information related to the history of passage of collected data through the edge apparatus 200 and encrypted information of the first hash value, generated from the passage history information using the public key associated with the edge apparatus 200. Furthermore, the reception processing unit 131 decrypts the first hash value using the private key associated with the edge apparatus 200. Then, the reception processing unit 131 transmits the received data to the generation processing unit 133.

Generation Processing Unit 133

The generation processing unit 133 generates a second hash value from the corresponding passage history information, for each edge apparatus 200 through which the collected data has passed.

Maintaining Unit 135

The maintaining unit 135 compares the second hash value generated in the generation processing unit 133 and the first hash value received in the reception processing unit 131, for each edge apparatus 200, through which the collected data has passed, and maintains the corresponding passage history information only when the first hash value and the second hash value match. To be more specific, the maintaining unit 135 stores the corresponding passage history information in the storage unit 120. On the other hand, when the first hash value and the second hash value do not match, the maintaining unit 135 determines that the corresponding passage history data has been tampered with, and, for example, discards the processing history information without storing it in the storage unit 120.

The maintaining unit 135 stores a passage history data table, in which the identification information of the collected data (data ID), the passage time at which the collected data passed through the edge apparatus 200, and the identification information of the edge apparatus 200 through which the collected data has passed (edge ID) are associated with each other, in the storage unit 120. FIG. 13 is a diagram to show a specific example of the passage history data table 1300, in which the identification information of the collected data (data ID), the passage time at which the collected data passed through the edge apparatus 200, and the identification information of the edge apparatus 200 through which the collected data has passed (edge ID) are associated with each other. As described above, at the same time data is stored, the maintaining unit 135 automatically configures the value that uniquely identifies the collected data record in the passage history data table 1300, and stores that configured value as the above-described data ID.

In addition, the maintaining unit 135 stores the data processing apparatus information which relates to the edge apparatus 200, and which has been examined by the data distributor, in the storage unit 120. FIG. 14 is a diagram to show a specific example of data processing apparatus information 1400 that has been examined by a data distributor. Referring to FIG. 14, the data processing apparatus information 1400 includes the identification information of the edge apparatus 200 (edge ID), the registration date, the registrant, and the electronic certificate registered for the edge apparatus 200.

Public Processing Unit 137

The public processing unit 137 obtains a variety of types of data included in the passage history data table 1300, stored in the storage unit 120, and displays the obtained collected data and the passage history information, to the data user, per data ID. Furthermore, the public processing unit 137 displays the data processing apparatus information 1400 obtained using the edge ID as a key.

(3) Process Flow

Next, the flow of processing according to the second example embodiment will be described.

First, the data distributor confirms whether each edge apparatus 200 (edge device) is manufactured in advance by a reliable vendor and installed by a reliable vendor. After that, where a private key and a public key are produced in advance, the data distributor stores the private key in the data managing apparatus 100 (storage unit 120), and stores an electronic certificate issued by an electronic certificate authority based on the public key, in the edge apparatus 200 (storage unit 220).

Next, the edge apparatus 200 (obtaining unit 231) divides the data received in the network communication unit 210 from another piece of edge apparatus 200, into collected data and passage history data. Following this, the edge apparatus 200 (obtaining unit 231) transmits the collected data and the passage history data to the generation processing unit 235.

The generation processing unit 235 sets the time the data was received (the passage time) as "Passed time" and the identification information of the edge apparatus 200 as "Edge ID", and generates a first hash value using these passed time and edge ID. Then, the generation processing unit 235 uses a value, in which the first hash value is encrypted with the public key associated with the electronic certificate affixed with an electronic signature in the edge apparatus 200 (the storage unit 220) as a hash value, and generates one record of passage history data.

The generated passage history data is attached to the end of the passage history data received in the generation processing unit 235. Then, the passage history data is combined with the collected data in the transmission processing unit 237 and transmitted to another piece of edge apparatus 200 (edge device) located on the collection route near the edge apparatus 200.

The data managing apparatus 100 (reception processing unit 131) divides the collected data received from the edge apparatus 200 and a series of processing history data. Then, if the first hash value included in the processing history data and the second hash value, generated from the processing history information included in the processing history data match, the data managing apparatus 100 maintains (stores) the corresponding collected data and passage history information in the storage unit 120.

The public processing unit 137 displays the collected data stored in the storage unit 120, in response to an access request from the data user, where the data ID is the key. Furthermore, the public processing unit 137 displays the passage history information in response to an access request from the data user, where the data ID is the key. Furthermore, in response to an access request from the data user, where the edge ID is the key, and in response to a request from the data user, the public processing unit 137 displays the data processing apparatus information.

As described above, according to the second example embodiment, the data user is able to verify whether or not there is arbitrary data modification, with respect to the processing performed on each edge apparatus 200 (edge device) in the data collection stage.

5. Third Example Embodiment

Next, a third example embodiment of the present disclosure will be described below with reference to FIG. 15 and FIG. 16. Although the first and the second example embodiments described above are specific example embodiments, the third example embodiment is a more generalized example embodiment.

<5.1. Configuration of Data Managing Apparatus 100>

Figure 15:
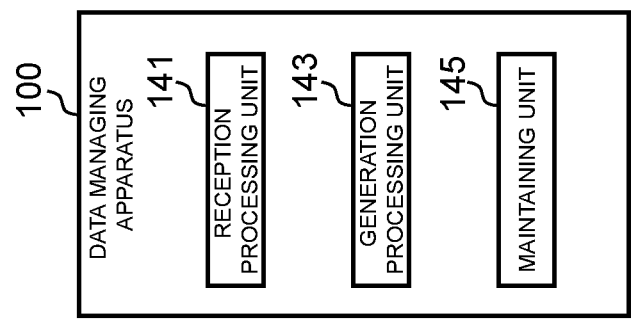
FIG. 15 is a block diagram to show an example of a schematic configuration of the data managing apparatus 100 according to a third example embodiment.

FIG. 15 is a block diagram to show an example of a schematic configuration of data managing apparatus 100 according to the third example embodiment. Referring to FIG. 15, the data managing apparatus 100 includes a reception processing unit 141, a generation processing unit 143, and a maintaining unit 145.

The reception processing unit 141, the generation processing unit 143, and the maintaining unit 145 may be implemented by one or more processors and a memory (for example, non-volatile memory and/or volatile memory) and/or a hard disk. The reception processing unit 141, the generation processing unit 143 and the maintaining unit 145 may be implemented by the same processor, or may be implemented separately by different processors. The memory may be included in these one or more processors, or may be outside these one or more processors.

<5.2. Configuration of Data Processing Apparatus 300>

FIG. 16 is a block diagram to show an example of a schematic configuration of edge apparatus 200 according to the third example embodiment. Referring to FIG. 16, the edge apparatus 200 includes an obtaining unit 311, a generation processing unit 313, and a transmission processing unit 315.

The obtaining unit 311, the generation processing unit 313 and the transmission processing unit 315 may be implemented by one or more processors and a memory (for example, non-volatile memory and/or volatile memory) and/or a hard disk. The obtaining unit 311, the generation processing unit 313 and the transmission processing unit 315 may be implemented by the same processor, or may be implemented separately by different processors. The memory may be included in these one or more processors, or may be outside these one or more processors.

<5.3. Operation Example>

An operation example according to the third example embodiment will be described.

According to the third example embodiment, the data managing apparatus 100 (the reception processing unit 141) receives collection history information related to the history of the data collection process and encrypted information of the first hash value, generated from the collection history information using the public key associated with the data collection process. Also, the data managing apparatus 100 (generation processing unit 143) generates a second hash value from the collection history information. Also, when the first hash value, decrypted from the encrypted information using the private key associated with the data collection process, and the second hash value match, the data managing apparatus 100 (the maintaining unit 145) maintains the collection history information.

Furthermore, according to the third example embodiment, the data processing apparatus 300 (the obtaining unit 311) obtains collection history information related to the history of the data collection process. Furthermore, the data processing apparatus 300 (the generation processing unit 313) uses the public key associated with the data collection process and generates encrypted information of the first hash value from the collection history information. Furthermore, the data processing apparatus 300 (the transmission processing unit 315) transmits the collection history information and the encrypted information of the first hash value.

Relationship with First and Second Example Embodiments

As an example, the reception processing unit 141, the generation processing unit 143, and the maintaining unit 145 provided in the data managing apparatus 100 according to the third example embodiment may operate the reception processing unit 131, the generation processing unit 133, and the maintaining unit 135 provided in the data managing apparatus 100, respectively, in accordance with the first or the second example embodiment. Also, the obtaining unit 311, the generation processing unit 313, and the transmission processing unit 315 provided in the edge apparatus 200 according to the third example embodiment may operate the obtaining unit 231, the generation processing unit 235, and the transmission processing unit 237 provided in the edge apparatus 200, respectively, in accordance with the first or the second example embodiment. In this case, the description of the first and second example embodiments is also applicable to the third example embodiment. Note that the third example embodiment is not limited to this example.

The third example embodiment has been described above.

According to the third example embodiment, for example, when the first hash value and the second hash value match, it is confirmed that the passage history information is not tampered, and the passage history information is maintained, so that it is possible to properly prevent tampering of data, which might take place in the data collection route.

6. Other Example Embodiments

Although example embodiments of the present disclosure have been described above, the present disclosure is by no means limited to these example embodiments. It will be understood by those of ordinary skill in the art that these example embodiments are simply examples, and that a variety of changes can be made without departing from the scope and spirit of the present disclosure.

For example, the steps in the processes described in the Specification do not necessarily have to be executed in chronological order according to the order described in the sequence diagram. For example, the steps in the processes may be executed in an order different from the order illustrated in the sequence diagram, or may be executed in parallel. Also, some of the steps in the processes may be deleted, or additional steps may be attached to the processes.

Also, apparatus to have the components (for example, the reception processing unit, the generation processing unit, and/or the maintaining unit) of the data managing apparatus described in the Specification (for example, one or more pieces of apparatus (or units) among a number of pieces of apparatus (or units) that constitute the data managing apparatus, or a module for one of the plurality of pieces of apparatus (or units)) may be provided. Furthermore, a method to include processes by these components may be provided, and a program to cause a processor to execute processes in these components may be provided. Also, a non-transitory computer-readable recording medium that records this program may be provided. Obviously, such apparatus, module, method, program, and non-transitory computer-readable recording medium are included in the present disclosure.

Furthermore, apparatus to have the components (for example, the obtaining unit, the generation processing unit, and/or the transmission processing unit) of the edge apparatus or the data processing apparatus described in the Specification (for example, one or more pieces of apparatus (or units) out of a plurality of pieces of apparatus (or units) constituting edge apparatus or data processing apparatus, or a module for one of the plurality of pieces of apparatus (or units)) may be provided. Furthermore, a method to include processes by these components may be provided, and a program to cause a processor to execute processes in these components may be provided. Also, a non-transitory computer-readable recording medium that records this program may be provided. Obviously, such apparatus, module, method, program, and non-transitory computer-readable recording medium are included in the present disclosure.

Some of or all of the example embodiments can be described as in the following supplementary notes, but are not limited to the following.

(Supplementary Note 1)

A data managing apparatus comprising:

a reception processing unit configured to receive collection history information related to a history of a data collection process and encrypted information of a first hash value generated from the collection history information using a public key associated with the data collection process;

a generation processing unit configured to generate a second hash value from the collection history information; and a maintaining unit configured to maintain the collection history information when the first hash value, decrypted from the encrypted information using a private key associated with the data collection process, and the second hash value match.

(Supplementary Note 2)

The data managing apparatus according to Supplementary Note 1, wherein the collection history information is processing history information related to a history of processing performed on collected data.

(Supplementary Note 3)

The data managing apparatus according to Supplementary Note 2, wherein the processing history information includes at least one of time the processing was performed and identification information of a processing program for performing the processing.

(Supplementary Note 4)

The data managing apparatus according to Supplementary Note 2 or 3, wherein the processing history information includes at least one of data before being subjected to the processing and data after being subjected to the processing.

(Supplementary Note 5)

The data managing apparatus according to Supplementary Note 1, wherein the collection history information is passage history information related to a history of passage of collected data through a data processing apparatus.

(Supplementary Note 6)

The data managing apparatus according to Supplementary Note 5, wherein the passage history information includes at least one of passage time of the collected data passed through the data processing apparatus and identification information of the data processing apparatus through which the collected data has passed.

(Supplementary Note 7)

The data managing apparatus according to any one of Supplementary Notes 1 to 6, wherein the data collection process is one of a plurality of data collection processes, the reception processing unit is configured to receive the collection history information and the encrypted information of the first hash value for each of the plurality of data collection processes, the generation processing unit is configured to generate a second hash value from the collection history information for each of the plurality of data collection processes, and the maintaining unit is configured to maintain, for each of the plurality of data collection processes, the collection history information when the first hash value, decrypted from the encrypted information using a private key associated with the data collection process, and the second hash value match.

(Supplementary Note 8)

The data managing apparatus according to Supplementary Note 7, wherein each of the plurality of data collection processes is executed by a plurality of pieces of data processing apparatus existing on an acquisition route of collected data, and the reception processing unit is configured to receive the collection history information and the encrypted information of the first hash value from one of a plurality of pieces of data processing apparatus.

(Supplementary Note 9)

A data processing apparatus comprising:

an obtaining unit configured to obtain collection history information related to a history of a data collection process;

a generation processing unit configured to generate encrypted information of a first hash value from the collection history information using a public key associated with the data collection process; and a transmission processing unit configured to transmit the collection history information and the encrypted information of the first hash value.

(Supplementary Note 10)

The data processing apparatus according to Supplementary Note 9, wherein the collection history information is processing history information related to processing for collected data in accordance with a processing program.

(Supplementary Note 11)

The data processing apparatus according to Supplementary Note 10, further comprising an activating unit configured to activate the processing program to start the processing for the collected data when electronic signature data is set in the processing program.

(Supplementary Note 12)

A data managing method comprising:

receiving collection history information related to a history of a data collection process and encrypted information of a first hash value generated from the collection history information using a public key associated with the data collection process;

generating a second hash value from the collection history information; and maintaining the collection history information when the first hash value, decrypted from the encrypted information using a private key associated with the data collection process, and the second hash value match.

(Supplementary Note 13)

A data processing method comprising:

obtaining collection history information related to a history of a data collection process;

generating encrypted information of a first hash value from the collection history information using a public key associated with the data collection process; and transmitting the collection history information and the encrypted information of the first hash value.

(Supplementary Note 14)

A program that causes a processor to execute:

receiving collection history information related to a history of a data collection process and encrypted information of a first hash value, generated from the collection history information using a public key associated with the data collection process;

generating a second hash value from the collection history information; and maintaining the collection history information when the first hash value, decrypted from the encrypted information using a private key associated with the data collection process, and the second hash value match.

(Supplementary Note 15)

A program that causes a processor to execute:

obtaining collection history information related to a history of a data collection process;

generating encrypted information of a first hash value from the collection history information using a public key associated with the data collection process; and transmitting the collection history information and the encrypted information of the first hash value.

This application claims priority based on Japanese Patent Application No. 2019-188685 filed on Oct. 15, 2019, the entire disclosure of which is incorporated herein.

In a system in which data is collected, it is possible to properly prevent tampering of data, which might take place in the data collection route.

What is claimed is:

1. A data managing apparatus comprising:
  a memory storing instructions; and
  one or more processors configured to execute the instructions to:
    receive collection history information related to a history of a data collection process and encrypted information of a first hash value generated from the collection history information using a public key associated with the data collection process;
    generate a second hash value from the collection history information; and
    maintain the collection history information when the first hash value, decrypted from the encrypted information using a private key associated with the data collection process, and the second hash value match,
  wherein the data collection process is one of a plurality of data collection processes executed chronologically,
  wherein the plurality of data collection processes is respectively executed by a plurality of pieces of data processing apparatus existing on an acquisition route of collected data, and
  wherein the one or more processors is further configured to execute the instructions to:
    receive the collection history information and the encrypted information of each of the first hash value for the plurality of data collection processes,
    generate a second hash value from the collection history information for each of the plurality of data collection processes, and
    maintain, for each of the plurality of data collection processes, the collection history information when the first hash value, decrypted from the encrypted information using a private key associated with the data collection process, and the second hash value match.

2. The data managing apparatus according to claim 1, wherein the collection history information is processing history information related to a history of processing performed on collected data.

3. The data managing apparatus according to claim 2, wherein the processing history information includes at least one of time the processing was performed and identification information of a processing program for performing the processing.

4. The data managing apparatus according to claim 2, wherein the processing history information includes at least one of data before being subjected to the processing and data after being subjected to the processing.

5. The data managing apparatus according to claim 1, wherein the collection history information is passage history information related to a history of passage of collected data through a data processing apparatus.

6. The data managing apparatus according to claim 5, wherein the passage history information includes at least one of passage time of the collected data passed through the data processing apparatus and identification information of the data processing apparatus through which the collected data has passed.

7. The data managing apparatus according to claim 1 wherein the one or more processors are configured to execute the instructions to receive the collection history information and the encrypted information of the first hash value from one of a plurality of pieces of data processing apparatus.

8. A data managing method comprising:

receiving collection history information related to a history of a data collection process and encrypted information of a first hash value generated from the collection history information using a public key associated with the data collection process;

generating a second hash value from the collection history information; and maintaining the collection history information when the first hash value, decrypted from the encrypted information using a private key associated with the data collection process, and the second hash value match, wherein the data collection process is one of a plurality of data collection processes executed chronologically, wherein the plurality of data collection processes is respectively executed by a plurality of pieces of data processing apparatus existing on an acquisition route of collected data, and wherein the data managing method further comprises:

receiving the collection history information and the encrypted information of each of the first hash value for the plurality of data collection processes, generating a second hash value from the collection history information for each of the plurality of data collection processes, and maintaining, for each of the plurality of data collection processes, the collection history information when the first hash value, decrypted from the encrypted information using a private key associated with the data collection process, and the second hash value match.

* * * * *